(12) United States Patent
Friedmann et al.

(10) Patent No.: US 10,425,117 B2
(45) Date of Patent: Sep. 24, 2019

(54) SPLIT MICROWAVE BACKHAUL ARCHITECTURE WITH SMART OUTDOOR UNIT

(75) Inventors: Jonathan Friedmann, Tel-Aviv (IL); Moshe Penso, Kiryat Uno (IL); Igal Kushnir, Azur (IL); Eran Ridel, Rosh Ha'aiyn (IL); Kobi Sturkovich, Netanya (IL)

(73) Assignee: Maxlinear Asia Singapore PTE LTD, Singapore (SG)

(*) Notice: Subject to any disclaimer, the term of this patent is extended or adjusted under 35 U.S.C. 154(b) by 498 days.

(21) Appl. No.: 13/535,199

(22) Filed: Jun. 27, 2012

(65) Prior Publication Data

US 2013/0135985 A1     May 30, 2013

Related U.S. Application Data

(60) Provisional application No. 61/565,469, filed on Nov. 30, 2011.

(51) Int. Cl.
 *H04B 1/38* (2015.01)
(52) U.S. Cl.
 CPC ..................... *H04B 1/38* (2013.01)
(58) Field of Classification Search
 CPC ............... H04L 1/0061; H04W 24/04; H04Q 2213/13166; H04B 1/38; H04B 10/58;
(Continued)

(56) References Cited

U.S. PATENT DOCUMENTS

| 5,548,807 A | 8/1996 | Ueda |
| 5,640,691 A | 6/1997 | Davis et al. |

(Continued)

FOREIGN PATENT DOCUMENTS

| CN | 1735999 A | 2/2006 |
| CN | 101317332 A | 12/2008 |

(Continued)

OTHER PUBLICATIONS

Office Action directed to related Taiwanese Patent Application No. 101133671, dated Jul. 17, 2014; 6 pages.
(Continued)

*Primary Examiner* — Chi Ho A Lee
*Assistant Examiner* — Andrew Lee
(74) *Attorney, Agent, or Firm* — McAndrews, Held & Malloy, Ltd.

(57) ABSTRACT

An advanced split microwave architecture is provided. The advanced split microwave architecture includes a smart outdoor communication unit including a digital N-Plexer configured to multiplex and/or demultiplex a received data signal in the digital domain, a processor unit configured to carry out instructions to control operation of the digital N-Plexer, and a converter module configured to convert the received data signal between the digital domain and the analog domain. The smart outdoor communication unit further includes an RF module, having digital capabilities, configured to correct errors within the received data signal in the digital domain, perform a conversion of the received data signal, to amplify a power of the received data signal, and to perform automatic gain control in the digital domain.

20 Claims, 6 Drawing Sheets

(58) Field of Classification Search
CPC .......... H04B 2001/0425; H04B 7/1852; H04B 1/1027
See application file for complete search history.

(56) References Cited

U.S. PATENT DOCUMENTS

| | | | |
|---|---|---|---|
| 5,987,060 A * | 11/1999 | Grenon et al. | 375/213 |
| 6,144,165 A | 11/2000 | Liedenbaum | |
| 6,480,477 B1 * | 11/2002 | Treadaway | H04L 1/0003 370/314 |
| 6,731,946 B1 * | 5/2004 | Stanwood et al. | 455/517 |
| 6,782,211 B1 | 8/2004 | Core | |
| 7,643,512 B2 | 1/2010 | Gorsetman et al. | |
| 7,839,842 B2 | 11/2010 | Zhang et al. | |
| 7,856,048 B1 | 12/2010 | Smaini et al. | |
| 8,018,375 B1 | 9/2011 | Alexopoulos et al. | |
| 8,095,088 B2 * | 1/2012 | Shen et al. | 455/114.3 |
| 8,344,800 B2 * | 1/2013 | Baik | H04B 7/15585 330/149 |
| 8,391,423 B2 * | 3/2013 | Kim | H04L 25/0216 375/146 |
| 8,488,970 B2 * | 7/2013 | Huang et al. | 398/115 |
| 2002/0008579 A1 * | 1/2002 | Mucenieks et al. | 330/149 |
| 2003/0043077 A1 | 3/2003 | Alexopoulos et al. | |
| 2003/0137329 A1 | 7/2003 | Van Der Valk et al. | |
| 2003/0152140 A1 * | 8/2003 | Antoniak | 375/219 |
| 2003/0156668 A1 | 8/2003 | Atkinson et al. | |
| 2004/0106380 A1 | 6/2004 | Vassiliou et al. | |
| 2004/0203528 A1 | 10/2004 | Ammar et al. | |
| 2005/0124307 A1 * | 6/2005 | Ammar et al. | 455/183.2 |
| 2006/0098614 A1 | 5/2006 | Moon et al. | |
| 2007/0069901 A1 * | 3/2007 | Tuck et al. | 340/573.1 |
| 2007/0076827 A1 * | 4/2007 | Beamish | H04L 27/3809 375/345 |
| 2007/0129031 A1 | 6/2007 | Newton et al. | |
| 2008/0002581 A1 * | 1/2008 | Gorsetman et al. | 370/232 |
| 2008/0014866 A1 | 1/2008 | Lipowski et al. | |
| 2008/0260066 A1 * | 10/2008 | Cai | H03F 1/3294 375/297 |
| 2008/0287076 A1 | 11/2008 | Shen et al. | |
| 2009/0115757 A1 | 5/2009 | Bae | |
| 2009/0124213 A1 | 5/2009 | Rubin et al. | |
| 2009/0152445 A1 | 6/2009 | Gardner, Jr. | |
| 2009/0168864 A1 | 7/2009 | Teramoto | |
| 2009/0232257 A1 * | 9/2009 | Bury | 375/341 |
| 2010/0067476 A1 | 3/2010 | Periyalwar et al. | |
| 2010/0272163 A1 | 10/2010 | Prager et al. | |
| 2011/0051654 A1 | 3/2011 | Blankenship et al. | |
| 2011/0080985 A1 | 4/2011 | Secker et al. | |
| 2011/0286552 A1 | 11/2011 | Briand | |
| 2012/0083304 A1 | 4/2012 | Yang et al. | |
| 2012/0093100 A1 | 4/2012 | Qin et al. | |
| 2012/0195392 A1 | 8/2012 | Kushnir et al. | |
| 2012/0220246 A1 | 8/2012 | Kushnir et al. | |
| 2012/0307695 A1 | 12/2012 | Yehezkely et al. | |
| 2013/0094554 A1 | 4/2013 | Kennard | |
| 2013/0113650 A1 * | 5/2013 | Behbahani et al. | 342/27 |
| 2013/0128936 A1 * | 5/2013 | Kennard et al. | 375/222 |
| 2013/0135986 A1 | 5/2013 | Sturkovich et al. | |
| 2013/0136039 A1 | 5/2013 | Sturkovich et al. | |
| 2013/0136163 A1 | 5/2013 | Friedmann et al. | |
| 2013/0137381 A1 | 5/2013 | Vassiliou et al. | |
| 2013/0178177 A1 | 7/2013 | Kushnir et al. | |

FOREIGN PATENT DOCUMENTS

| | | |
|---|---|---|
| CN | 101465705 A | 6/2009 |
| CN | 101771441 A | 7/2010 |
| CN | 102255119 A | 11/2011 |
| EP | 1298848 A2 | 4/2003 |
| EP | 1 962 431 A1 | 8/2008 |
| EP | 2 299 775 A1 | 3/2011 |
| JP | 4462043 B2 | 2/2010 |
| JP | 2011-199880 A | 10/2011 |
| TW | I335156 B | 12/2010 |
| WO | WO 2004/064197 A1 | 7/2004 |
| WO | WO 2011/032790 A1 | 3/2011 |

OTHER PUBLICATIONS

Office Action directed to related Chinese Patent Application No. 201210372182.6, dated Jul. 2, 2014; 7 pages.
Office Action for related Taiwanese Patent Application No. 101133022, dated Mar. 24, 2014; 8 pages.
Office action directed to related Korean Patent Application No. 10-2012-0103653, dated Apr. 22, 2014; 8 pages.
Kuwano, et al., "Digitized Radio-over-Fiber (DROF) System for Wide-Area Ubiquitous Wireless Network," NTT Corporation, Yokosuka, Japan, 2006; 4 pages.
"Common Public Radio Interface (CPRI); Interface Specification," CPRI Specification V5.0, Sep. 21, 2011; 119 pages.
English-language Abstract of Japanese Patent No. 4462043 B2; 1 page.
IEEE Standard for Information Technology—Telecommunications and Information Exchange Between Systems—Local and Metropolitan Area Networks—Specific Requirements, Version 802.3-2008 (Revision of 802.3-2005), Part 3: Carrier Sense Multiple Access with Collision Detection (CSMA/CD) Access Method and Physical Layer Specifications, Section 4, pp. 1-586, IEEE, Piscataway NJ, 2008.
Partial Search Report for European Application No. EP 12 00 6163, European Patent Office, Munich, Germany, 9 pages, dated Apr. 3, 2013.
Communication from the Examining Division of the European Patent Office, directed to related European Patent Application No. 12 006 163.5, dated Mar. 11, 2014; 9 pages.
Office Action directed to related Taiwanese Patent Application No. 101140962, dated Mar. 24, 2014; 8 pages.
Office Action directed to related Chinese Patent Application No. 201210501036.9, dated Sep. 24, 2014; 6 pages.
English-Language Abstract for Chinese Patent Publication No. CN 101771441 A, published Jul. 7, 2010; 2 pages.
Office Action directed to related Chinese Patent Application No. 201210372182.6, dated Feb. 2, 2015; 8 pages.
"Fixed Radio Systems; Point-to-Point Equipment; Presenting Important Aspects of the Spatial Frequency Reuse Method; DTR/TM-4153", European Telecommunications Standards Institute, Nov. 23, 2006, Valbonne, France; pp. 1-35.
European Search Report directed to related European Patent Application No. 13005543.7, dated Mar. 4, 2014; 9 pages.

\* cited by examiner

SPLIT MICROWAVE BACKHAUL ARCHITECTURE WITH SMART OUTDOOR UNIT

CROSS-REFERENCE TO RELATED APPLICATIONS

This application claims the benefit of U.S. Provisional Patent Application No. 61/565,469, filed Nov. 30, 2011, which is incorporated herein by reference in its entirety.

BACKGROUND OF THE INVENTION

Field of the Invention

The invention generally relates to a split microwave backhaul architecture, and more specifically to a split microwave backhaul architecture having a smart outdoor unit.

Related Art

Conventional microwave backhaul architectures are generally implemented as either a split outdoor unit (split ODU) configuration or an all outdoor unit (all ODU) configuration. Conventional split ODU configurations are generally comprised of both an indoor unit (IDU) and an outdoor unit (ODU), where the IDU and the ODU are connected over a coaxial interconnect. The IDU in a conventional split ODU configuration typically includes a modem, a digital-to-analog converter and a baseband-to-intermediate frequency converter. Under normal operation, these conventional split ODU configurations generally involve transmitting an analog signal, at an intermediate frequency, over the coaxial interconnect between the IDU and the ODU. However, during this transmission, the analog signal may be subjected to various errors, which may result from deficiencies associated with the IDU and/or the coaxial interconnect. Additionally, the lack of digital capabilities of these conventional ODUs generally render them ineffective in terms of correcting the errors within the analog signal.

Mobile backhaul providers are experiencing a growing demand for increased capacity as well as a shift from voice services to data services. These factors are driving mobile backhaul networks towards high capacity IP/Ethernet connections. Additionally, the transition to 4G and LTE networks is also driving the need for higher capacity, and moving more packet traffic onto mobile backhaul networks. As a result, the limitations of conventional split ODU configurations make it increasingly difficult to meet these increasing user demands.

In some instances, all ODU configurations have been used as an alternative to these conventional split ODU configurations. Conventional all ODU configurations include only an ODU, and thus do not include an IDU. The ODU therefore includes a modem, a digital-to-analog converter as well as a baseband-to-radio frequency converter. Implementing all of these functional components in the ODU typically provides some digital capabilities within the ODU. This is in contrast to the typical ODU utilized in the conventional split ODU configuration, which generally lacks digital capabilities. However, the conventional all ODU configurations also have limitations. For example, including all of this functionality in the ODU increases installation and repair costs, may result in inefficient power consumption, and may decrease an overall reliability of the entire configuration.

Thus, neither conventional split ODU configurations nor all ODU configurations effectively meet the increasing demands for capacity. Therefore, a need exists for a split microwave backhaul architecture that overcomes the deficiencies of conventional architectures.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
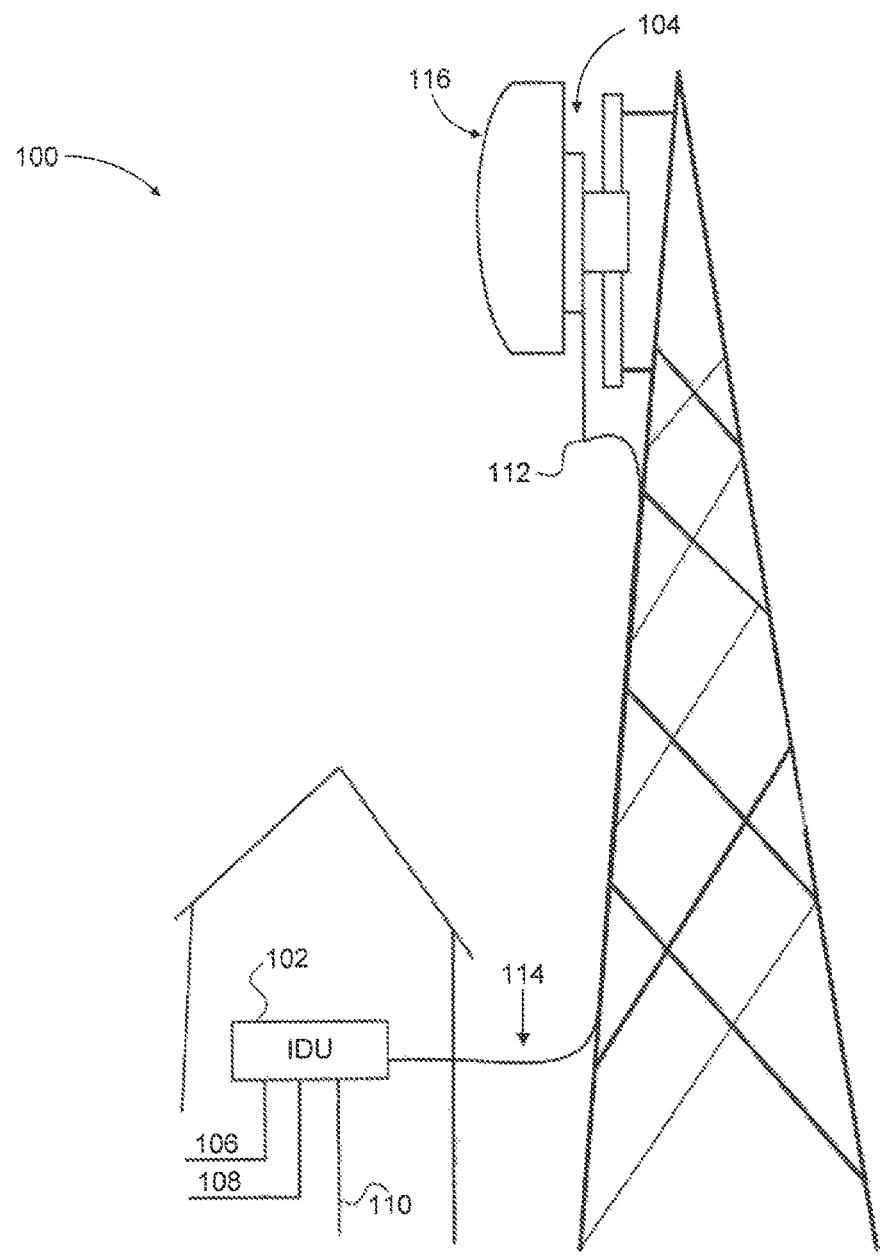
FIG. 1 illustrates a block diagram of a split microwave backhaul system according to an exemplary embodiment of the present invention.

Embodiments of the invention will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

An Exemplary Split Microwave Backhaul System

FIG. 1 illustrates a block diagram of a split microwave backhaul system 100 that includes an indoor communication unit (IDU) 102 and an outdoor communication unit (ODU) 104 according to an exemplary embodiment of the present invention. Microwave, as used throughout this disclosure, refers to both terrestrial point-to-point radio communications, as well as point-to-multipoint communications.

Split microwave backhaul system 100 initiates communication by accessing an information source, which may comprise, for example, audio data 106, video data 108, or any other data capable of being transmitted over a high capacity IP/Ethernet connection 110. To facilitate this communication, IDU 102 is coupled to a core network. In particular, IDU 102 is configured to acquire one or more sequences of digital data (e.g., audio data 106, video data 108, data transmitted over a high capacity IP/Ethernet connection 110, or the like) from the core network. IDU 102 may also be configured to support several additional services, such as Ethernet, TDM, and control data that is aggregated over a radio link.

IDU 102 may be implemented at a location that is substantially removed from ODU 104, such as at a location at ground level. For example, IDU 102 may be positioned inside of a home or an office building, or the like. Conversely, ODU 104 may be implemented at a substantially elevated location, such as on top of a pole, on top of an antenna tower, or on top of a building. In some embodiments, IDU 102 and ODU 104 may be separated by a distance up to approximately 300 meters.

IDU 102 and ODU 104 are connected via a communication pathway 112, which is configured such that data 114 may be transmitted between IDU 102 and ODU 104. Communication pathway 112 may comprise an Ethernet cable, a fiber optic cable, a coaxial cable, an intermediate frequency (IF) cable, a twisted pair cable, a shielding cable, a category 5 cable, a category 6 cable, or one or more copper wires. Therefore, depending on a chosen communication medium, communication pathway 112 may facilitate transmission of an analog signal or a digital between IDU 102 and ODU 104. In some embodiments, communication pathway 112 may be a wireless communication channel. Additionally, an antenna 116 may be coupled to ODU 104, and may be positioned substantially close to ODU 104. Therefore, split microwave backhaul system 100 is implemented such that data 114 may be transmitted from IDU 102, across communication pathway 112, to ODU 104, and subsequently to antenna 116 where communication over a wireless link may then be initiated. Split microwave backhaul system 100 also is implemented such that data 114 received by antenna 116 may be transmitted from ODU 104 over communication pathway 112 to IDU 102.

As will be discussed in greater detail below, ODU 104 may be a "smart ODU." For example, ODU 104 may have digital capabilities, which may be implemented to improve the radio frequency (RF) functionalities within ODU 104. However, ODU 104 may not include a modem, which may instead be implemented within IDU 102. Therefore, when ODU 104 is implemented as a "smart ODU," split microwave backhaul system 100 may provide more efficient communication between IDU 102 and ODU 104. The limitations generally associated with the transmission of data in conventional split ODU configurations are eliminated because of the digital capabilities, and the corresponding improved RF functionalities, of ODU 104. For example, ODU 104 may sample data 114 received from IDU 102 and then correct the detected errors (e.g. by removing noise from data 114), which may be associated with either the IDU 102 or the communication pathway 112. ODU 104 may then process data 114 such that it may be properly transmitted over a wireless link via antenna 116.

In an embodiment, ODU 104 may also correct errors associated with a signal received over a wireless link via antenna 116. Split microwave backhaul system 100 may also be configured to support adaptive coding and modulation (ACM), which provides high reliability of split microwave backhaul system 100 even in extreme weather, such as wind, rain, hail, or the like.

IDU 102 includes a modem assembly, while ODU 104 includes at least some RF functionalities as well as corresponding digital capabilities.

In embodiments of the present invention, specific functionality is offloaded from ODU 104 to IDU 102. The offloading of functionality (e.g. the modem assembly), while maintaining at least some RF functionality within ODU 104, provides numerous advantages for split microwave backhaul system 100 over conventional split ODU configurations. For example, by implementing the modem assembly within IDU 102, as opposed to ODU 104, power consumption by split microwave backhaul system 100 may become more efficient. Similarly, it may be easier, and less expensive, to convey power to IDU 102 than ODU 104 because IDU 102 may be located at ground level, while ODU 104 may be located at an elevated level (e.g., on top of the pole, antenna tower, or the like). Thus, when more functional components are implemented in IDU 102 rather than ODU 104, the necessary power may be supplied to split microwave backhaul system 100 at a lower cost.

An additional advantage of offloading the modem assembly from ODU 104 to IDU 102 may be a reduction in both installation and repair costs. A significant portion of the expenditures associated with typical split ODU configurations are derived from installation costs. In particular, it may be difficult to transport all of the necessary equipment to the physical location of the ODU, which may be at an elevated location and thus may be difficult to reach. Similarly, the probability that an ODU will need repairs substantially increases as the number of functional components implemented in the ODU increases. With typical split ODU configurations, repair costs are generally high as well, because when the ODU does need to be repaired, it may be expensive to employ a skilled technician to climb to the ODU's elevated location to execute the repairs. Therefore, by offloading at least the modem assembly from ODU 104 to IDU 102, split microwave backhaul system 100 may be implemented and maintained at a relatively low cost.

Split microwave backhaul system 100 is also configured to provide a high mean time between failures (MTBF), which refers to the predicted elapsed time between inherent failures of a system during operation. Split microwave backhaul system 100 may also be implemented using existing infrastructure (e.g., Ethernet or other existing technology), thus aiding in reducing the expenditures associated with split microwave backhaul system 100. However, it will be apparent to those skilled in the related art(s) that other advantages may be realized without departing from the spirit and scope of the present disclosure.

Although the description of the present invention is to be described in terms of microwave backhaul architecture, those skilled in the relevant art(s) will recognize that the present invention may be applicable to other architectures without departing from the spirit and scope of the present invention.

Figure 2A:
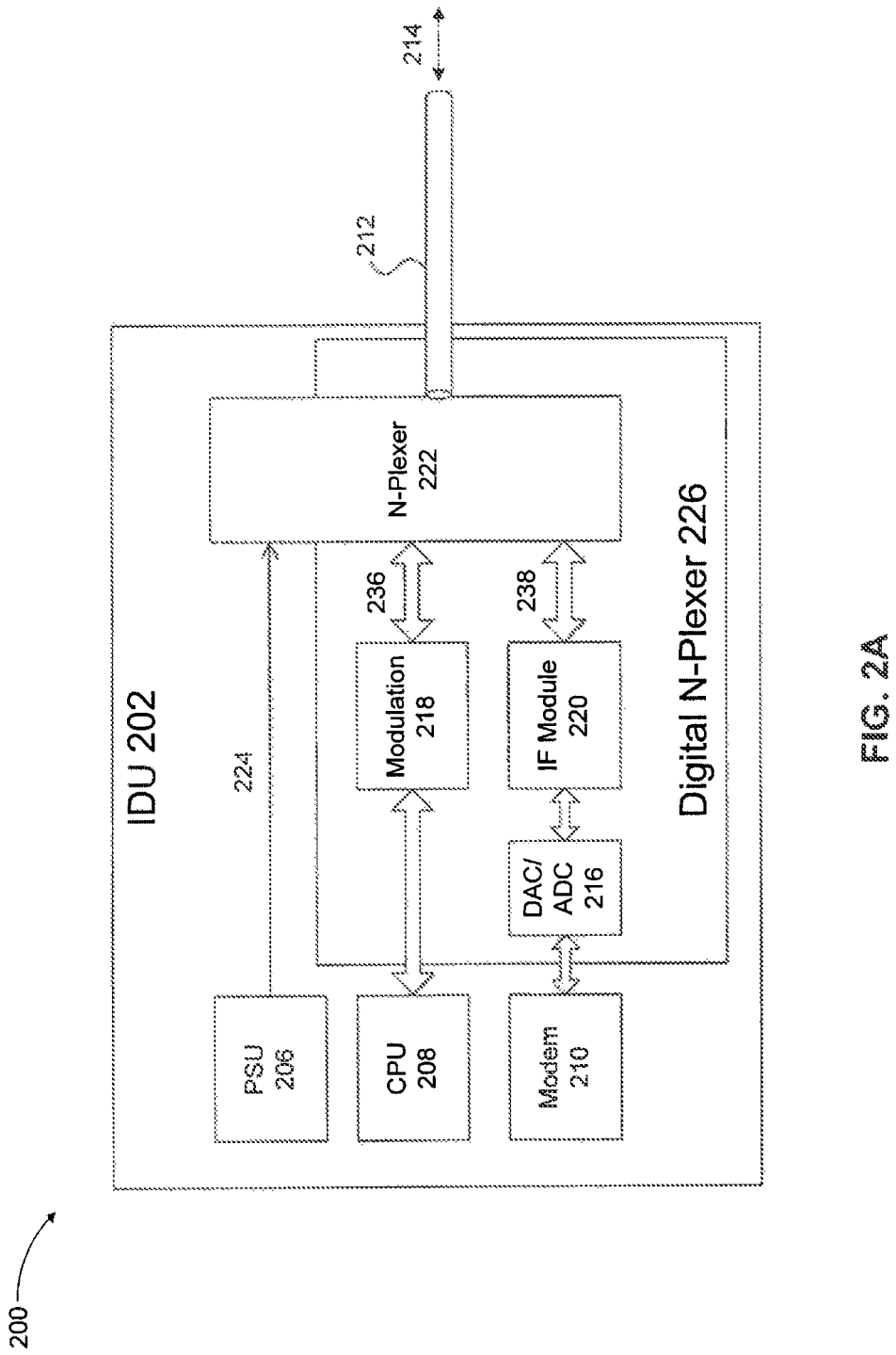
FIG. 2A illustrates a block diagram of an indoor communication unit (IDU) for implementation within a split microwave backhaul system according to an exemplary embodiment of the present invention.
Figure 2B:
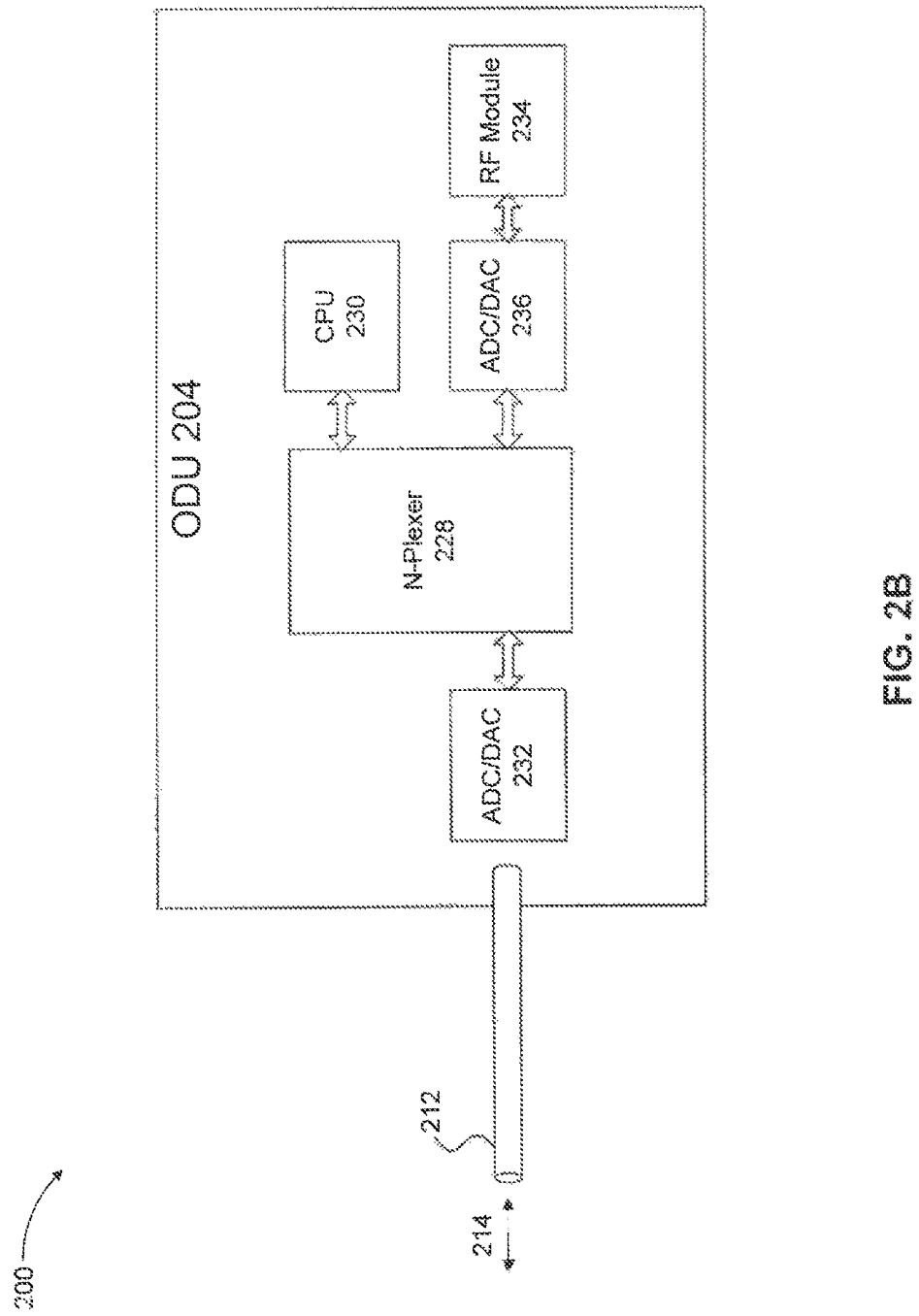
FIG. 2B illustrates a block diagram of an outdoor communication unit (ODU) for implementation within a split microwave backhaul system according to an exemplary embodiment of the present invention.

An Exemplary Indoor Communication Unit (IDU) and Outdoor Communication Unit (ODU) Configuration FIGS. 2A and 2B illustrate block diagrams of an indoor communication unit (IDU) 202 and an outdoor communication unit (ODU) 204, respectively, for use within a split microwave backhaul system 200 according to an exemplary embodiment of the present invention. IDU 202 and ODU 204 are coupled together via a communication pathway 212. IDU 202 may represent an exemplary embodiment of IDU 102 of FIG. 1, and ODU 204 may represent an exemplary embodiment of ODU 104 of FIG. 1.

IDU 202 includes a power supply unit (PSU) 206, a CPU 208, a modem assembly 210, a digital-to-analog/analog-to-digital (DAC/ADC) block 216, an modulation block 218, and an intermediate frequency (IF) module 220. In some embodiments, IDU 202 may also include an N-Plexer 222.

PSU 206 is configured to produce a DC output voltage 224, CPU 208 is configured to carrying out instructions to perform arithmetical, logical, and input/output operations of one or more of the aforementioned elements contained within IDU 202. In an embodiment, CPU 208 may control operation of modulation block 218 and N-Plexer 222.

Modem assembly 210 is configured to perform modulation and demodulation of data 214 that is to be transmitted between IDU 202 and ODU 204. In some embodiments, modem assembly 210 may function substantially similar to a baseband modem. Further, modem assembly 210 may be configured to cancel out noise associated with IDU 202 or communication pathway 212.

DAC/ADC block 216 may be configured to transmit and/or receive data from modem assembly 210. DAC/ADC block 216 is also configured to perform digital-to-analog and/or analog-to-digital conversions of data 214 such that data 214 is suitable for transmission over communication pathway 212.

Modulation block 218 may be configured to transmit and/or or receive a signal from CPU 208. Modulation block 218 may also be configured to perform various modulation and/or demodulation techniques. In an embodiment, modulation block 218 may be configured to perform amplitude-shift keying. For example, modulation block 218 may be configured to perform amplitude-shift keying by utilizing a finite number of amplitudes, where each amplitude is assigned a unique pattern of binary digits. Each pattern may then be configured to form the specific symbol that is represented by the particular amplitude. Additionally, when modulation block 218 is configured to perform demodulation, modulation block 218 determines the amplitude of the received signal and maps it back to the symbol it represents, thus recovering the original data.

IF module 220 may be configured to transmit and/or receive data from DAC/ADC block 216. IF module 220 is also configured to perform a frequency conversion of the received data such that data 214 is suitable for transmission over communication pathway 212. For example, IF module 220 may be configured to convert data 214 from a baseband frequency to an IF.

N-Plexer 222 may be configured to permit N-directional communication over communication pathway 212. In particular, N-Plexer 222 is configured to isolate IDU 202 from ODU 204, while permitting them to share a common antenna. N-Plexer 222 is also configured to receive DC output voltage 224 from PSU 206, to receive a control signal 236 (e.g. a Telemetry ASK signal) output from modulation block 218, and to receive an IF signal 238 output from IF module 220. Additionally, N-Plexer 222 may be configured to convert and/or combine each of these inputs to form data 214. N-Plexer 222 is also configured to transmit and/or receive data 214, over communication pathway 212, between IDU 202 and ODU 204. In an embodiment, N-Plexer 222 may function substantially as an analog duplexer (multiplexer/demultiplexer).

In embodiments, communication pathway 212 may include one or more links (e.g. pathways). Communication pathway 212 may be configured to permit transmission of approximately four different signal between IDU 202 and ODU 204. For example, communication pathway 212 may be configured to transmit a transmission communication signal (TX), a receipt communication signal (RX), an up control signal, and a down control signal. Additionally, or alternatively, communication pathway 212 may be configured to allow TX, RX, a Telemetry ASK signal (output from modulation block 218) and DC output voltage 224 to coexist on communication pathway 212. In an embodiment, communication pathway 212 may represent an IF cable, and thus the conversion to the analog domain of these signals may be performed at IDU 202 (e.g. by DAC/ADC block 216).

In an exemplary embodiment, DAC/ADC block 216, modulation block 218, IF module 220 and N-Plexer 222 may be replaced by Digital N-Plexer 226. In particular, Digital N-Plexer 226 may be configured to multiplex/demultiplex the required signal in the digital domain, rather than in the analog domain. Subsequently, Digital N-Plexer 226 may allow communication pathway 212 to be implemented as either a digital pathway or an analog pathway. Using Digital N-Plexer 226 allows for a simpler implementation of IDU 202. For example, when implementing IDU 202 having Digital N-Plexer 226, no analog functionality would be required, and instead only a single digital chip substrate would be needed. As a result, the cost of implementing IDU 202 may be decreased. Additionally, using a Digital N-Plexer 226 may provide an improved yield, shorter production testing, lower assembly cost, lower peripheral component count, and may support greater distances between IDU 202 and ODU 204, to provide some examples.

ODU 204 may also include an N-Plexer 228, which may be implemented in several different manners. For example, N-Plexer 228 may be an analog N-Plexer, a digital N-Plexer, or a split function N-Plexer (e.g., where N-Plexer 228 is partially analog and partially digital). When N-Plexer 228 represents a digital N-Plexer, N-Plexer 228 may function substantially similar to Digital N-Plexer 226. In particular, N-Plexer 228 may be configured to multiplex/demultiplex signals in the digital domain. N-Plexer 228 also allows for a simpler implementation of ODU 204 because no analog functionality would be required, and instead only a single digital chip substrate would need to be implemented within ODU 204. Therefore, the cost of implementing ODU 204 may also be decreased. Similar to Digital N-Plexer 226, implementing N-Plexer 228 within ODU 204 may provide an improved yield, shorter production testing, lower assembly cost, lower peripheral component count, and may support greater distances between IDU 202 and ODU 204, to provide some examples.

In an embodiment, IDU 202 and ODU 204 may be configured to perform an N-Plexer elimination technique. In particular, the functionality directed towards filtering TX, after being received over communication pathway 212, and RX, before being transmitted over communication pathway 212, may be removed from N-Plexers 226 and 228. Instead, this functionality may be implemented within the digital chip substrate (e.g. integrated circuit) that comprises IDU 202 and the digital chip substrate (e.g. integrated circuit) that comprises ODU 204. IDU 202 and ODU 204 may then filter the required signals through any combination of an analog filtering process, a signal sampling process and a digital filtering process.

ODU 204 may also include a CPU 230, ADC/DAC blocks 232 and 236, and an RF module 234. CPU 230 may be configured to function substantially similar to CPU 208. In particular, CPU 230 is configured to carry out instructions to perform arithmetical, logical, and input/output operations of one or more of the elements contained within ODU 204. In an embodiment, CPU 208 may control operation of N-Plexer 228. ADC/DAC blocks 232 and 236 may be configured to transmit and/or receive data from N-Plexer 228. ADC/DAC blocks 232 and 236 are also configured to perform analog-to-digital and/or digital-to-analog conversions of data 214 such that data 214 may be properly transmitted and/or received over communication pathway 212. In an embodiment, ODU 204 may be configured such that as data 214 travels along the transmission path, data 214 traverses through communication pathway 212, to ADC/DAC block 232, to N-Plexer 228, to ADC/DAC block 236 and to RF module 234. Additionally, as data 214 travels along the reception path, data 214 traverses through RF module 234, to ADC/DAC block 236, to N-Plexer 228, to ADC/DAC block 232, and then over communication pathway 212.

RF module 234 may be configured to transmit and/or receive data from ADC/DAC block 236. RF module 234 is also configured to perform a frequency conversion of data 214 such that data 214 may be properly received over communication pathway 212. For example, when data 214 is received at RF module 234, data 214 may have a frequency residing in the IF range. Therefore, RF module 234 may up-convert data 214 from an IF to a RF such that data 214 may then be transmitted over a wireless link. RF module 234 may also be configured to down-convert a signal received over the wireless link from a RF to an IF such that the received signal may be transmitted over communication pathway 212 to IDU 202.

An Exemplary Outdoor Communication Unit (ODU)

Figure 3:
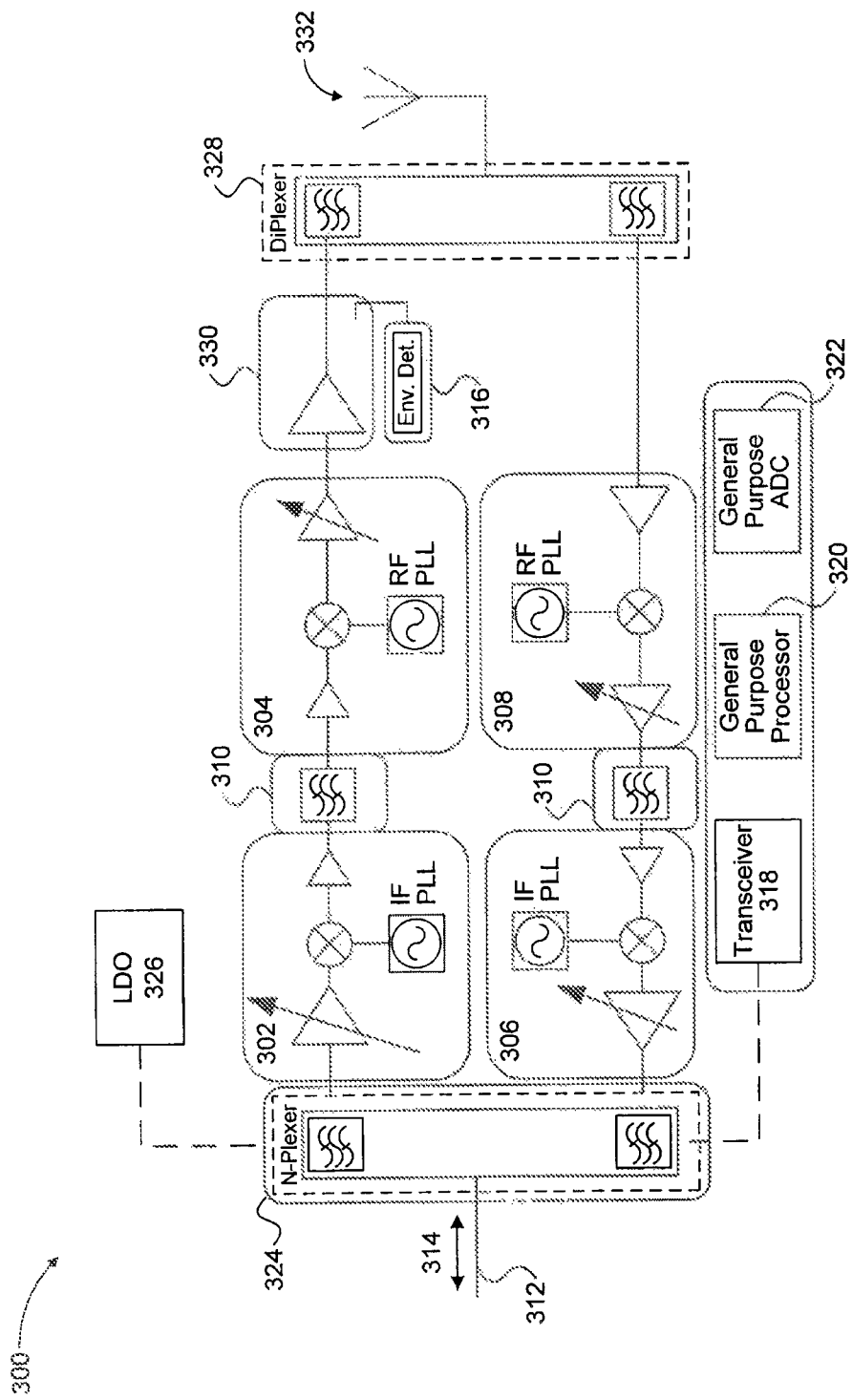
FIG. 3 illustrates a block diagram of an outdoor communication unit (ODU) for implementation within a split microwave backhaul system according to an exemplary embodiment of the present invention.

FIG. 3 illustrates a block diagram of an outdoor communication unit (ODU) 300 according to an exemplary embodiment of the present invention. ODU 300 may represent an exemplary embodiment of ODU 204. ODU 300 includes multiple frequency converters 302, 304, 306 and 308, a power amplifier 330, an envelope detector 316, a transceiver module 318, a general purpose processor 320, a general purpose analog-to-digital converter (ADC) 322, an N-Plexer 324, a low dropout regulator (LDO) 326, and a diplexer 328. In embodiments, ODU 300 may also include filters 310.

Frequency converters 302 and 304 may function substantially as frequency up-converters. In particular, when data 314 is received over communication pathway 312, the data may have a frequency in the IF range. Therefore, frequency converters 302 and 304 may up-convert data 314 from IF to RF such that it may be transmitted over a wireless communication link via antenna 332.

Frequency converters 306 and 308 may function substantially as frequency down-converters. In particular, when a signal is received at antenna 332, over the wireless link, the data may have a frequency in the RF range. Therefore, frequency converters 302 and 304 may down-convert the received signal from RF to IF such that it may be transmitted over communication pathway 312.

Each frequency converter 302-308 may include a phased locked loop (PLL). For example, frequency converters 302 and 306 may each include an IF PLL, and frequency converters 304 and 308 may each include an RF PLL. The PLLs may be implemented as electronic circuits, each consisting of a variable frequency oscillator and a phase detector. These electronic circuits may be configured to compare a phase of an input signal (e.g. data 314 or the received signal from antenna 332) with a phase of a signal derived from its output oscillator and adjust a frequency of its oscillator to keep these phases matched. A signal from the phase detector may also be used to control the oscillator via a feedback loop.

Frequency converters 302 and 304, as well as frequency converters 306 and 308, may have a filter 310 implemented therebetween. As discussed above, filters 310 may be configured to filter data 314 such that data 314 may be transmitted and/or received over communication pathway 312. For example, filters 310 may be configured to perform any combination of an analog filtering process, a signal sampling process and a digital filtering process.

Power amplifier 330 may be configured to amplify data 314, after data 314 has been up-converted by frequency converters 302 and 304. In particular, power amplifier 330 is configured to amplify data 314 such that it is capable of being transmitted over the wireless link via antenna 332. Power amplifier 330 may be coupled to envelope detector 316, which may be configured to reduce ODU 400's power consumption. For example, envelope detector 316 may be configured to receive a high-frequency input and provide an output that represents the envelope of the original input. Envelope detector 316 may also include a capacitor, a resistor and a diode. The capacitor is configured to store up charge on a rising edge of the input, and release the charge slowly through the resistor when the input falls. The diode may be implemented in series with the capacitor, and may be configured to rectify the input, such that current is allowed to flow only when a positive input terminal is at a higher potential than a negative input terminal. Envelope detector 316 may utilize either a half-wave or a full-wave rectification of the input to convert the input (e.g. an AC signal) into a pulsed DC signal.

Transceiver module 318 is configured to control communication between ODU 300 and a corresponding IDU. In particular, transceiver module 318 may control the operation of ODU 300 by sending command controls to the aforementioned functional elements included within ODU 300. In some embodiments, transceiver module 318 may function substantially as an amplitude-shift keying transceiver, such that when data 314 is transmitted and/or received over communication pathway 312, transceiver module 318 performs an amplitude-shift keying process on data 314. Transceiver module 318 is coupled to general purpose processor 320 and general purpose ADC 322, as well as N-Plexer 324. General purpose processor 320 and general purpose ADC 322 may function substantially similar to CPU 230 and ADC/DAC block 232, respectively.

LDO 326 is coupled to N-Plexer 324 and is configured to regulate DC linear output voltage (e.g. DC output voltage 224 received from IDU 202). LDO 326 may also be configured to operate at a relatively low minimum operating voltage, to operating voltage, to operate a relatively high efficiency and to produce a relatively low heat dissipation.

Diplexer 328 is configured to permit bi-directional communication over the wireless link. In particular, diplexer 328 is configured to isolate frequency converters 302 and 304 from frequency converters 306 and 308, while permitting them to share a common antenna 332. In particular, diplexer 328 is configured to receive data 314 from power amplifier 330, and to output data 314 to antenna 332 such that it may be transmitted over the wireless link. Additionally, or alternatively, diplexer 328 is configured to receive a signal from antenna 332, and to output the signal to frequency converters 308 and 306.

Frequency converters 302, 304, 306 and 308, filters 310, power amplifier 330, envelope detector 316, transceiver module 318, general purpose processor 320 and general purpose ADC 322 may be implemented on a single digital chip substrate (e.g. an integrated circuit), while LDO 326, diplexer 328 and at least a portion of N-Plexer 324 may not be implemented on the chip substrate. When ODU 300 is implemented having each of these elements on a single digital chip substrate, ODU 300 has substantial digital capabilities, thus allowing ODU 300 to perform multiple digital processing techniques. These digital capabilities and digital processing techniques will be discussed in greater detail below.

Additionally, even though at least a portion of N-Plexer 324 may not be implemented on the chip substrate, N-Plexer 324 may be implemented in a substantially simpler manner because of the digital capabilities of ODU 300. For example, N-Plexer 324 may be simplified such that it only needs to attenuate approximately 10 dB to approximately 20 dB, while conventional external N-Plexers (e.g. N-Plexers implemented off-chip) may need to attenuate approximately 50 dB to approximately 80 dB. The simplified design of N-Plexer 324 may also provide an improved yield, shorter production testing, lower assembly cost, lower peripheral component count, and may support greater distances between ODU 300 and a corresponding IDU, to provide some examples. In some embodiments, N-Plexer 324 may function substantially similar to N-Plexer 228. In particular, N-Plexer 324 may be configured to multiplex/demultiplex the required signal in the digital domain. Therefore, N-Plexer 324 may also allow for a simpler implementation of ODU 300 because no analog functionality would be required. Instead, only a single digital chip substrate would need to be implemented within ODU 300. Therefore, the cost of implementing ODU 300 may also be decreased.

Frequency converters 302, 304, 306 and 308, power amplifier 330, filters 310, envelope detector 316, transceiver module 318, general purpose processor 320, general purpose ADC 322, N-Plexer 324, LDO 326, and diplexer 328 are provided for illustrative purposes only, and is not meant to limit the disclosure in any way. Those skilled in the relevant art(s) will recognize that different combinations and/or orientations of these elements, as well as additional elements, are possible without departing from the spirit and scope of the present disclosure.

Figure 4:
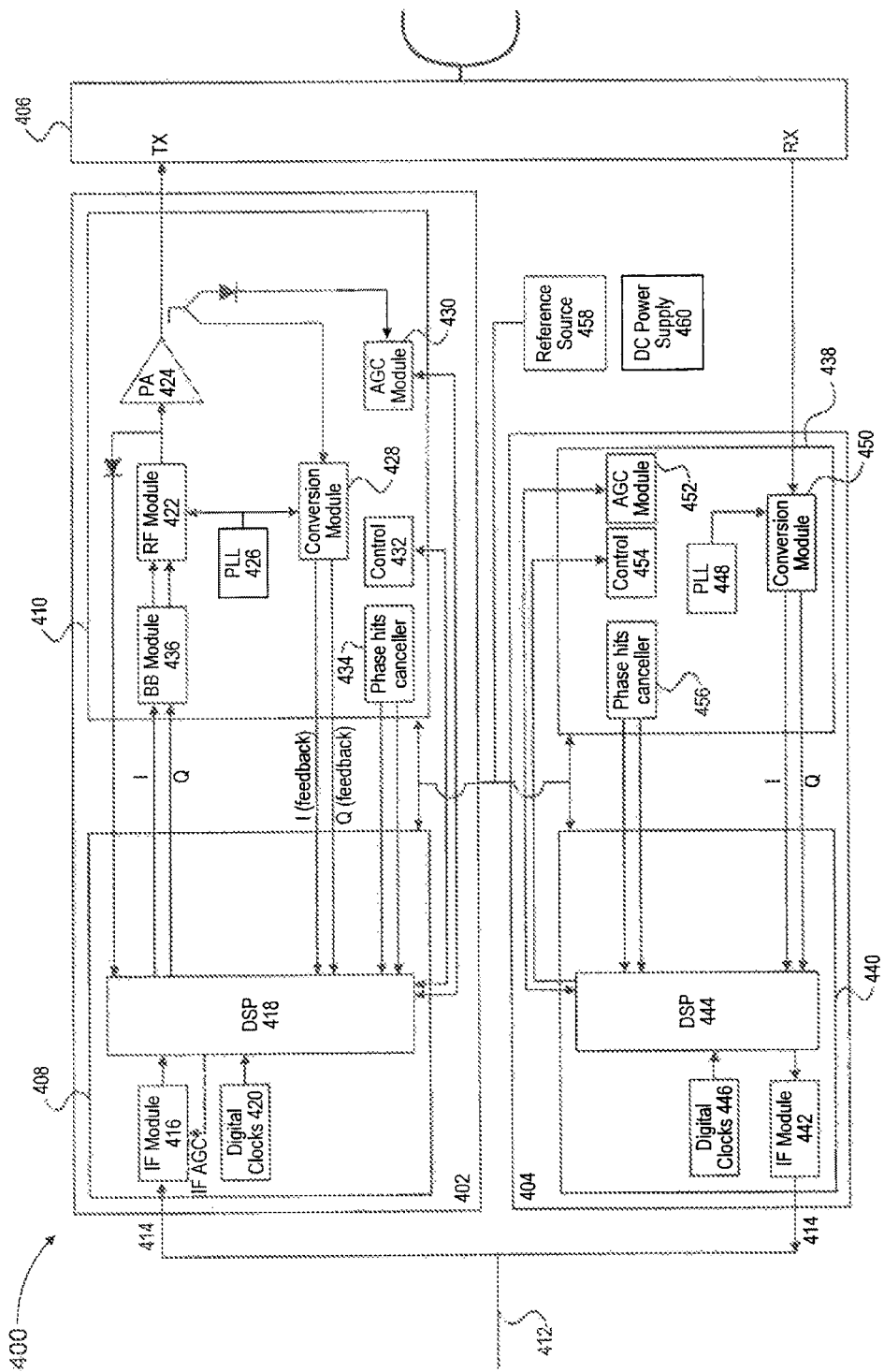
FIG. 4 illustrates a schematic diagram of an outdoor communication unit (ODU) for implementation within a split microwave backhaul system according to an exemplary embodiment of the present invention.

FIG. 4 illustrates a block diagram of an outdoor communication unit (ODU) 400 according to an exemplary embodiment of the present invention. ODU 400 may represent an exemplary embodiment of ODU 300. ODU 400 may also represent a "smart ODU." ODU 400 includes a transmission block 402, a reception block 404 and a duplexer 406. ODU 400 may further have a N-Plexer (not shown), which may represent an exemplary embodiment of N-Plexer 324.

Transmission block 402 is configured to receive data 414 over a communication pathway 412, and to transmit data 414 to duplexer 406. Similarly, reception block 404 is configured to receive a signal from duplexer 406 and to transmit data 414 over communication pathway 412. Communication pathway 412 and data 414 may represent exemplary embodiments of communication pathway 112 and data 114.

Transmission block 402 may include a first transmission sub-section 408 and a second transmission sub-section 410. First transmission sub-section 408 includes an IF module 416, a digital signal processor (DSP) 418, and multiple digital clocks 420. IF module 416 may represent an exemplary embodiment of IF module 220, and is configured to receive an IF automatic gain control (IF AGC) signal from DSP 418. In some embodiments, IF module 416 may be digitally implemented with a WBAFE module (wide band capture ADC/DAC). DSP 418 includes an analog front-end (AFE), and is configured to receive inputs from both IF module 416 and digital clocks 420, as well as multiple feedback loops from various elements within second transmission sub-section 410. DSP 418 may also be configured to implement various custom algorithms, and to perform post installation software updates. In an embodiment, DSP 418 may be configured to perform robust RF online calibration, which may utilize data 414 and communication pathway 412 to improve an overall performance of ODU 400.

Second transmission sub-section 410 includes a baseband (BB) module 436, an RF module 422, a power amplifier (PA) 424, a phase locked loop (PLL) 426, a conversion module 428, an AGC module 430, a control block 432 and a phase hits canceller 434. RF module 422 may represent an exemplary embodiment of RF module 234, and PA 424 may represent an exemplary embodiment of power amplifier 330.

BB module 436 is configured to receive In-phase (I) and Quadrature (Q) signals from DSP 418. BB module 436 is also configured to perform a frequency conversion of the I and Q signals from a BB frequency to IF, RF module 422 is configured to receive the converted I and Q signals from BB module 436 and to combine the signals into a single signal. RF module 422 may also be configured to transmit and/or receive a signal from PLL 426 and/or conversion module 428. RF module 422 is also configured to convert the combined signal from IF to RF. RF module 422 is further configured to send the combined signal back to DSP 418.

PA 424 is configured to receive the combined signal from RF module 422 and to amplify the signal's power. PA 424 is also configured to transmit the combined signal (TX) to duplexer 406.

AGC module 430 is configured to receive a signal from PA 424, and to perform an automatic gain control operation on the signal. AGC module 430 is also configured to transmit and/or receive a signal between itself and DSP 418. Conversion module 428 is configured to receive a signal from PA 424 and to transmit and/or receive a combined signal from PLL 426 and/or RF module 422. Conversion module 428 may then perform a frequency conversion on at least one of the signal received from PA 424 and the combined signal received from PLL 426 and/or RF module 422. In particular, conversion module 428 may be configured to convert a signal from RF to BB. Conversion module 428 then outputs an I (feedback) signal and a Q (feedback) signal to DSP 418.

PLL 426 may be configured to transmit and/or receive a signal from RF module 422 and/or conversion module 428. In some embodiments, PLL 426 may be implemented as an electronic circuit, consisting of a variable frequency oscillator and a phase detector. This electronic circuit may be configured to compare a phase of an input signal with a phase of a signal derived from its output oscillator and adjust a frequency of its oscillator to keep these phases matched. A signal from the phase detector may also be used to control the oscillator via a feedback loop.

Control block 432 is configured to transmit and/or receive control and telemetry signals between itself and DSP 418. Phase hits canceller 434 is configured to sample signals (e.g. sampling PLL 426 for both a transmission and a reception), look for frequency jumps, and record any such frequency jumps in the digital domain. Phase hits canceller 434 is configured to correct phase hits and microphonics hits, which may be caused by physical phenomenon interacting with ODU 400 such as wind, rain, hail, or the like.

Reception block 404 may include a first reception sub-section 438 and a second reception sub-section 440. Second reception sub-section 440 includes an IF module 442, a DSP 444, and multiple digital clocks 446. IF module 442 may function substantially similar to IF module 416, and is configured to receive a signal from DSP 444. IF module is also configured to perform a frequency conversion of the signal received from DSP 444 such that IF module 442 may output data 414 to a corresponding IDU, via communication pathway 412. DSP 444 may function substantially similar to DSP 418, and is configured to receive inputs from digital clocks 446, as well as multiple feedback loops from various elements within first reception sub-section 438.

First reception sub-section 438 includes a phase locked loop (PLL) 448, a conversion module 450, an AGC module 452, a control block 454 and a phase hits canceller 456.

PLL 448 may function substantially similar to PLL 426. Conversion module 450 may function substantially similar to conversion module 428, and may be configured to receive a signal from PLL 448 and a signal (RX) from duplexer 406. Conversion module 450 may also be configured to transmit I and Q signals to DSP 444. AGC module 452 may function substantially similar to AGC module 430, and is configured to transmit and/or receive a signal between itself and DSP 444. Control block 454 may function substantially similar to control block 432, and is configured to receive a signal from DSP 444. Phase hits canceller 456 may function substantially similar to phase hits canceller 434.

First transmission sub-section 408 and second transmission sub-section 410, as well as first reception sub-section 438 and a second reception sub-section 440, may be communicably coupled together. Additionally, transmission block 402 and reception block 404 may be communicably coupled together, and may also be communicably coupled to a reference source 458 and a DC power supply 460.

ODU 400 may be implemented to provide frequency coverage in the range of approximately 5.92 GHz to approximately 43.5 GHz. ODU 400 may also be configured to support both split mount architectures and all ODU architectures. Additionally, or alternatively, ODU 400 may implemented to cover substantially all radio bands.

In an embodiment, first transmission sub-section 408 and second reception sub-section 440 may each represent a CMOS transistor, while second transmission sub-section 410 and first reception sub-section 438 may each represent a silicon-germanium (SiGe) transistor.

As discussed above, by implementing transmission block 402 and reception block 404 on a single digital chip substrate, ODU 400 has substantial digital capabilities, thus allowing ODU 400 to perform multiple digital processing techniques. In an embodiment, ODU 400 may utilize a digital repeater to perform the digital processing techniques. In particular, many of ODU 400's digital capabilities may be performed by sampling data 414, processing data 414 (allowing for at least some noise to be removed from data 414) and subsequently correcting a substantial amount of any error introduced in data 414. For example, these errors may represent frequency errors (e.g. phase hits), which may result from a physical disturbance of ODU 400, such as rain, hail, wind, or the like. ODU 400 may be configured to correct errors in data 414 by injecting correction metrics into data 414. In particular, ODU 400 may produce these correction metrics by performing adaptive digital pre-distortion, closed-loop distortion and/or phase shifting, to provide some examples. Adaptive digital pre-distortion allows for ODU 400 to dynamically compensate for power amplifier distortions. For example, because PA 424 may be formed of SiGe, it may have relatively low performance characteristics compared to convention off-chip PAs. Therefore, by performing adaptive digital pre-distortion, ODU 400 may compensate for PA 424's reduced performance. Adaptive digital pre-distortion also improves the performance of ODU 400 in terms of process aging and voltage/temperature changes. Further, adaptive digital pre-distortion may increase ODU 400's transmission power by approximately 2 dB to approximately 3 dB. Therefore, these adaptive digital pre-distortion capabilities may provide for a more efficient power consumption by ODU 400.

ODU 400 may also be configured to fix errors (e.g. noise) associated with a corresponding IDU and/or communication pathway 412. For example, in an embodiment an IDU may have non-linearities associated therewith. ODU 400 may be configured to eliminate these non-linearities by performing a post-distortion process, or the like. For example, ODU 400 may apply a polynomial (e.g. a correction metric) to data 414 to correct any non-linearities caused by a corresponding IDU. Therefore, a cleaner version of data 414 may be transmitted and/or received over communication pathway 412.

In some embodiments, the digital capabilities of ODU 400 may permit the implementation of a dual channel configuration. In particular, ODU 400 may be configured to transmit and/or receive data 414 over communication pathway 412, which may include multiple channels between an IDU and ODU 400. For example, ODU 400 may support communication over adjacent channels, non-adjacent channels, or a dual channel over a single cable. This dual channel configuration may enable communication pathway 412 to perform single chip cross polarization interference cancellation (XPIC) to increase its transmission capacity between ODU 400 and a corresponding IDU. In an embodiment, communication pathway 412 may have a link capacity of approximately 112 MHz, and may be configured to support approximately 2048 QAM. Additionally, or alternatively, communication pathway 412 may be configured to enable non-adjacent channel capacity aggregation, which may facilitate a relatively easy deployment of communication pathway 412 as well as ODU 400. Communication pathways 412 may be further configured to provide radio-link bonding to support an efficient link protection.

Errors that may exist within data 414 may represent RF errors (e.g. IQ mismatch, frequency dependent mismatch, phase hits, microphonics hits, noise and calibration issues). RF errors may be particularly problematic when working with high quality signals, because to properly transmit and/or receive high quality signals, ODU 400 should include high performance RF components. Therefore, to correct these RF errors, each of the components included within transmission block 402 and reception block 404 are implemented in the digital domain, rather than in the analog domain. For example, AGC modules 430 and 452 are configured to have a second order loop (where only a first order loop may be possible with AGC modules implemented in the analog domain), which may correct fading issues associated with communication pathway 412. Additionally, by implementing AGC modules 430 and 452 in the digital domain, their bandwidths may be kept constant.

ODU 400's digital capabilities also eliminate the need to implement some conventional functionality within ODU 400. For example, certain types of filters that were previously needed for dual up-conversion and for superheterodyning may be eliminated. Additionally, at least a portion of the N-Plexer may also be eliminated due to the digital filtering, and other digital processing, being performed by ODU 400.

ODU 400 is also configured to perform built-in smart testing, which may be performed at a die level, board level, or on the entire ODU 400. In particular, a loop-back mode may be implemented to test and calibrate ODU 400 and/or its internal components. In an embodiment, ODU 400's digital capabilities also allow it to be tested remotely (e.g. when ODU 400 is deployed in the field). If an error is detected during any one of these tests, the error(s) may also be corrected remotely, thus eliminating the expense of having to employ a skilled technician to travel to the physical location of ODU 400 and enacted potentially expensive repairs. In some embodiments, these remote tests and any subsequent corrections may be implemented by running a remote diagnostic test on ODU 400 and uploading a software packet designed to correct the specific error(s). However, those skilled in the relevant art(s) will recognize that other testing and correction techniques are possible without departing from the spirit and scope of the present disclosure.

In an embodiment, ODU 400 (or IDU 202) may be integrated with any one, or combination of, a powerline, Wi-Fi, LTE, WiMax, Bluetooth, radio(s), or the like. ODU 400 (or IDU 202) may also be integrated with other network functionality such as routers, bridges, and/or switches, to provide some examples. ODU 400 (or IDU 202) may be configured to perform a merger of different communication types (e.g. backhaul communication or LAN/point-to-point communication). Additionally, ODU 400 (or IDU 202) may be configured to prioritize each of the different communication types based on various different factors. ODU 400 (or IDU 202) may also be configured analyze each of the different communication types to provide quality of service (QoS) treatment.

Figure 5:
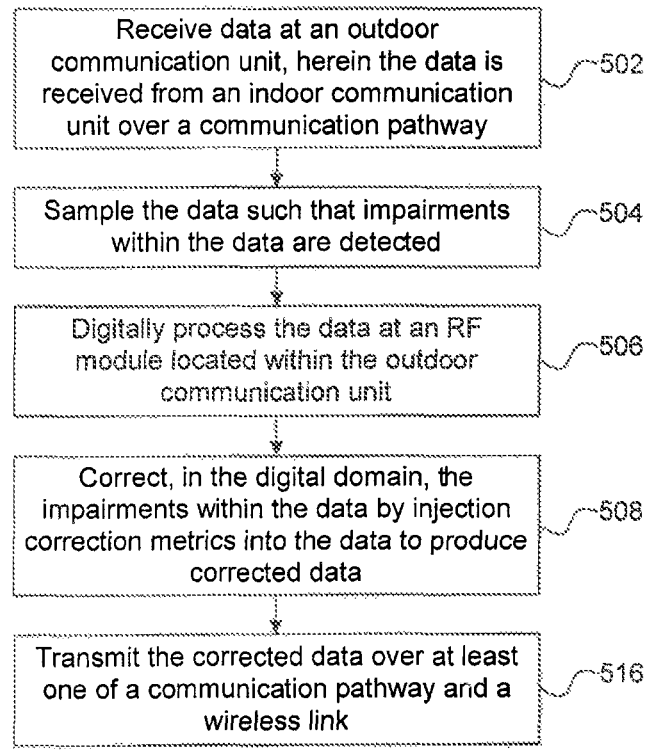
FIG. 5 is a flowchart of exemplary operational steps of correcting errors within a split microwave backhaul system according to an exemplary embodiment of the present invention.

An Exemplary Method of Correcting Errors within a Split Microwave Backhaul System FIG. 5 is a flowchart of exemplary method for correcting errors within a split microwave backhaul system according to an exemplary embodiment of the present invention. The flowchart of FIG. 5 is described with reference to embodiments of FIGS. 1-4. However, a method 500 is not limited to these embodiments.

Method 500 begins at step 502 where data 414 is received at ODU 400 from a corresponding IDU over communication pathway 412.

In step 504, data 414 is sampled within ODU 400. In particular, during sampling of data 414, any errors that may exists within data 414 are detected. In some embodiments, these errors may include phase hits and/or microphonics hits, which may be caused by physical phenomenon coming into contact with ODU 400 (e.g. wind, hail, rain, or the like). Errors within data 414 may also materialize as IQ mismatch, frequency dependent mismatch and calibration issues. These errors may also be associated with the corresponding IDU and/or communication pathway 412. For example, the corresponding IDU and/or communication pathway 412 may have non-linearities which could impair data 414 during transmission between an IDU and ODU 400. In some embodiments, errors within data 414 may result for its transmission over a wireless link.

In step 506, ODU 400 digitally processes data 414. For example, ODU 400 may perform adaptive digital pre-distortion, closed-loop distortion, post-distortion, and/or phase shifting. This digital processing may allow for ODU 400 to dynamically compensate for distortions within the split microwave backhaul system 200. Additionally, this digital processing may also improve the performance of ODU 400 in terms of process aging and voltage/temperature changes, and may provide for a more efficient power consumption by ODU 400.

In step 508, ODU 400 corrects the detected errors within data 414. In particular, ODU 400 injects correction metrics into data 414 to produce corrected data. These correction metrics may be produced using the digital processing techniques carried out in step 506 (e.g. adaptive digital pre-distortion, closed-loop distortion, post-distortion, and/or phase shifting). Additionally, or alternatively, ODU 400 may correct the detected errors by applying a polynomial to data 414 to correct any non-linearities caused by the corresponding IDU or communication pathway 412. In some embodiments, ODU 400 may also be configured to correct errors within data 414 that may result for its transmission over the wireless link.

In step 510, the corrected data is output from ODU 400. In particular, by correcting the errors within data 414, ODU 400 may be configured to properly transmit data 414 over communication pathway 412, to a corresponding IDU. Additionally, or alternatively, by correcting errors within data 414, ODU 400 may be configured to properly transmit data 414 over a wireless link via an antenna.

CONCLUSION

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. An outdoor communication unit, comprising:
   an N-Plexer configured to demultiplex a received data signal in the digital domain wherein the received data signal is communicated over a coaxial cable;
   an active front end operable to reduce deterioration associated with communication over the coaxial cable;
   a microprocessor, operably coupled to the N-Plexer, configured to carry out instructions to control operation of the N-Plexer;
   one or more converters, operably coupled to the N-Plexer, configured to convert the received data signal between the digital domain and the analog domain; and
   an RF processor, operably coupled to one of the one or more converters and having digital capabilities, configured to convert the received data signal from a baseband to a radio frequency, and to perform automatic gain control in the digital domain, wherein the RF processor comprises a canceller configured to correct errors in the received data signal by injecting a first correction metric into the received data signal, wherein the first correction metric is produced according to a post-distortion process, and wherein the errors in the received data signal result from a physical disturbance of the outdoor communication unit.

2. The outdoor communication unit of claim 1, wherein the RF module comprises a digital signal processor, operably coupled to the canceller, wherein the canceller is configured to sample the received data signal, detect frequency jumps, and record the frequency jumps in the digital domain.

3. The outdoor communication unit of claim 2, wherein the canceller is configured to make adaptive adjustments in response to phase hits and microphonics hits.

4. The outdoor communication unit of claim 2, comprising a digital repeater configured to facilitate transmission of the corrected received data signal between an indoor communication unit and the outdoor communication unit.

5. The outdoor communication unit of claim 1, wherein the canceller is configured to correct errors in the received data signal by injecting a second correction metric into the received data signal, wherein the second correction metric is produced according to at least one of an adaptive digital pre-distortion process, a closed-loop distortion process, and a phase shifting process.

6. The outdoor communication unit of claim 1, wherein the RF processor is configured to digitally filter the received data signal.

7. The outdoor communication unit of claim 4, comprising:
   an envelope detector configured to receive a high-frequency input and produce an output that represents an envelope of the high-frequency input; and
   a silicon-germanium (SiGe) power amplifier, coupled to the envelope detector, configured to amplify a power of the received data signal.

8. The outdoor communication unit of claim 1, wherein at least a portion of the N-Plexer is implemented off-chip.

9. The outdoor communication unit of claim 2, wherein the digital signal processor is configured to perform at least one of a post installation software update and an RF online calibration process to improve performance of the outdoor communication unit.

10. The outdoor communication unit of claim 7, wherein the SiGe power amplifier, the envelope detector, the digital repeater, the canceller, the digital signal processor, the RF processor, the one or more converters, and the microprocessor are implemented on a digital chip substrate.

11. The outdoor communication unit of claim 1, wherein the RF processor is configured to provide frequency coverage in the range of approximately 5.92 GHz to approximately 43.5 GHz.

12. The outdoor communication unit of claim 1, wherein the RF processor is configured to perform built-in smart testing.

13. A split microwave backhaul system, comprising:
    an indoor communication unit, having a modem assembly and a first N-Plexer, configured to perform modulation or demodulation of data, and to perform a conversion of the data; and
    an outdoor communication unit, operably coupled to the indoor communication unit via a communication pathway and having an active front end, a second N-Plexer and an RF processor with digital capabilities, configured to communicate the data over the communication pathway, to perform a conversion of the data, to amplify a power of the data, and to perform automatic gain control in the digital domain, wherein the communication pathway comprises a coaxial cable, and wherein the active front end is operable to reduce deterioration associated with communication over the coaxial cable, and wherein the RF processor comprises a canceller configured to correct errors in the data by injecting a first correction metric into the data, wherein the first correction metric is produced by performing a post-distortion process, and wherein the errors in the received data signal result from a physical disturbance of the outdoor communication unit.

14. The split microwave backhaul system of claim 13, wherein the communication pathway is a dual channel pathway.

15. The split microwave backhaul system of claim 14, wherein the communication pathway is configured to support communication over at least one of adjacent channels, non-adjacent channels and a dual channel over a single cable.

16. The split microwave backhaul system of claim 13, wherein the canceller is configured to correct errors in the data by injecting a second correction metric into the data, wherein the second correction metric is product according to at least one of an adaptive digital pre-distortion process, a closed-loop distortion process, and a phase shifting process.

17. The split microwave backhaul system of claim 13, wherein the RF processor is implemented on a digital chip substrate.

18. A method of correcting errors within a split microwave backhaul system, comprising:
  receiving data at an outdoor communication unit from an indoor communication unit over a communication pathway, wherein the communication pathway comprises a coaxial cable;
  using an active front end in the outdoor communication unit to reduce deterioration associated with communication over the coaxial cable;
  sampling the data such that errors within the data are detected, and wherein the errors within the data result from a physical disturbance of the outdoor communication unit;
  digitally processing the data at an RF processor located within the outdoor communication unit;
  producing a correction metric by performing a post-distortion process;
  correcting, in the digital domain, the errors within the data by injection the correction metric into the data to produce corrected data; and
  transmitting the corrected data over at least one of a communication pathway and a wireless link.

19. The method of claim 18, wherein the RF processor is implemented on a digital chip substrate and is configured to have digital capabilities.

20. The method of claim 18, wherein the correcting comprises injecting a second correction metric into the data, and wherein the second correction metric is produced according to at least one of an adaptive digital pre-distortion process, a closed-loop distortion process and a phase shifting process.

* * * * *